US012650639B2

(12) United States Patent
Song et al.

(10) Patent No.: US 12,650,639 B2
(45) Date of Patent: Jun. 9, 2026

(54) ADJUSTABLE INFLATABLE STRUCTURES USING SILVER-COATED TWISTED COIL POLYMER FIBERS

(71) Applicant: Toyota Motor Engineering & Manufacturing North America, Inc., Plano, TX (US)

(72) Inventors: Yuyang Song, Ann Arbor, MI (US); Shinnosuke Shimokawa, Ann Arbor, MI (US)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 197 days.

(21) Appl. No.: 18/734,595

(22) Filed: Jun. 5, 2024

(65) Prior Publication Data

US 2025/0377585 A1 Dec. 11, 2025

(51) Int. Cl.
*G03B 21/585* (2014.01)

(52) U.S. Cl.
CPC ................................. *G03B 21/585* (2013.01)

(58) Field of Classification Search
CPC ............................. G03B 21/58; G03B 21/585
See application file for complete search history.

(56) References Cited

U.S. PATENT DOCUMENTS

| | | | | |
|---|---|---|---|---|
| 4,323,301 A * | 4/1982 | Spector | ............... | G03B 21/585 |
| | | | | 359/443 |
| 11,725,635 B1 * | 8/2023 | Song | .................... | H05B 3/0004 |
| | | | | 60/528 |

| | | | | |
|---|---|---|---|---|
| 2012/0042577 A1 * | 2/2012 | Mcintosh | ............... | G03B 15/06 |
| | | | | 52/2.11 |
| 2015/0092353 A1 * | 4/2015 | Baik | ........................ | G09F 9/301 |
| | | | | 361/720 |
| 2022/0260062 A1 | 8/2022 | Li et al. | | |

(Continued)

FOREIGN PATENT DOCUMENTS

| | | |
|---|---|---|
| CN | 115050271 A | 9/2022 |
| CN | 113077713 B | 7/2023 |

(Continued)

OTHER PUBLICATIONS

Sewinfla. "33Ft Giant Inflatable Movie Screen with Blower—Front and Rear Projection—Blow Up Outdoor and Indoor Projector Screen for Party, Easy to Set Up", Retrieved from the Internet: <https://www.amazon.com/Sewinfla-Inflatable-Movie-Screen-Blower/dp/B08BG7QL3H?th=1>, retrieved Mar. 26, 2024. (14 pages).

(Continued)

*Primary Examiner* — Christopher E Mahoney

(74) *Attorney, Agent, or Firm* — Christopher G. Darrow; Darrow Mustafa PC

(57) ABSTRACT

Systems and methods described herein relate to using silver-coated twisted-coil polymer fibers to adjust the shape of inflatable structures, such as to provide an adjustable curved projection screen. In one embodiment, a method includes providing an adjustable inflation system capable of providing an electrical stimulus to a set of fibers within an inflatable structure where the set of fibers can adjust a surface of the inflatable structure from a first state to a second state based on the electrical stimulus.

20 Claims, 8 Drawing Sheets

(56)                    References Cited

U.S. PATENT DOCUMENTS

| | | | |
|---|---|---|---|
| 2023/0108120 A1 * | 4/2023 | Tanaka ................... | G06F 30/10 |
| | | | 703/1 |
| 2023/0341759 A1 | 10/2023 | Pineau et al. | |
| 2023/0357970 A1 | 11/2023 | Ridley et al. | |
| 2024/0084788 A1 * | 3/2024 | Song ..................... | F03G 7/0612 |
| 2024/0271338 A1 * | 8/2024 | Witham ................. | D04C 1/12 |

FOREIGN PATENT DOCUMENTS

| | | | | | |
|---|---|---|---|---|---|
| CN | 117275357 | A | 12/2023 | | |
| CN | 119148457 | A * | 12/2024 | ........... | G03B 21/585 |
| GB | 2508194 | A * | 5/2014 | ........... | G03B 21/58 |
| KR | 101286933 | B1 * | 7/2013 | .......... | G03B 21/585 |
| WO | WO-2013030354 | A2 * | 3/2013 | ........... | G03B 21/585 |
| WO | 2018191291 | A1 | 10/2018 | | |
| WO | 2022140062 | A1 | 6/2022 | | |

OTHER PUBLICATIONS

Sayok. "Sayok Inflatable Wall Tent Inflatable Curved Wall (16.4 x 6.56 x8.2ft) Photo Booth Backdrop for Party Wedding Event Congresses Trade Fairs", Retrieved from the Internet: <https://www.amazon.com/Inflatable-Photo-Booth-Wedding-x8-2ft/dp/B07H89KMJ4>, retrieved Mar. 26, 2024. (6 pages).

Karami et al. "Experimental study on silver coated twisted and coiled polymer muscles, 1-Ply and 2-Ply," Retrieved from the Internet: <https://www.utdallas.edu/~yonas.tadesse/data/Experimental%20study1plyand2ply.pdf>, retrieved Apr. 19, 2024. (25 pages).

* cited by examiner

ADJUSTABLE INFLATABLE STRUCTURES USING SILVER-COATED TWISTED COIL POLYMER FIBERS

TECHNICAL FIELD

The subject matter described herein relates, in general, to strategies for using silver-coated twisted coil polymer fibers to adjust the shape of an inflatable structure, such as to provide a curved projection screen with adjustable curvature.

BACKGROUND

Portable projection screens may be constructed using inflatable structures. For example, large inflatable structures that provide a rigid frame to which a screen can be attached or hung are particularly popular in the commercial marketplace. However, such inflatable structures are designed only for the singular purpose of holding a flat screen in a fixed position.

SUMMARY

In one embodiment, a system is disclosed. The system includes one or more processors and a memory communicably coupled to the one or more processors. The memory stores a command module including instructions that when executed by the one or more processors cause the one or more processors to provide an electrical stimulus to a set of fibers within an inflatable structure where the set of fibers can adjust a surface of the inflatable structure from a first state to a second state based on the electrical stimulus.

In one embodiment, a non-transitory computer-readable medium including instructions that when executed by one or more processors cause the one or more processors to perform one or more functions is disclosed. The instructions include instructions to provide an electrical stimulus to a set of fibers within an inflatable structure where the set of fibers can adjust a surface of the inflatable structure from a first state to a second state based on the electrical stimulus.

In one embodiment, a method is disclosed. In one embodiment, the method includes providing a testbench capable of providing an electrical stimulus to a set of fibers within an inflatable structure where the set of fibers can adjust a surface of the inflatable structure from a first state to a second state based on the electrical stimulus.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1A:
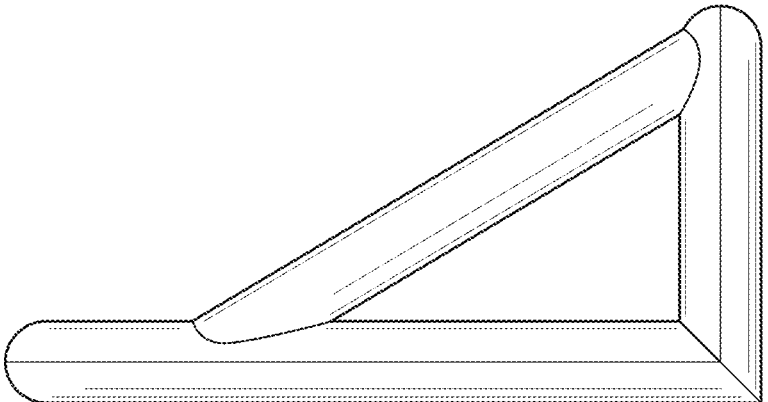
FIG. 1A illustrates one example of a prior art inflatable structure.
Figure 1A:
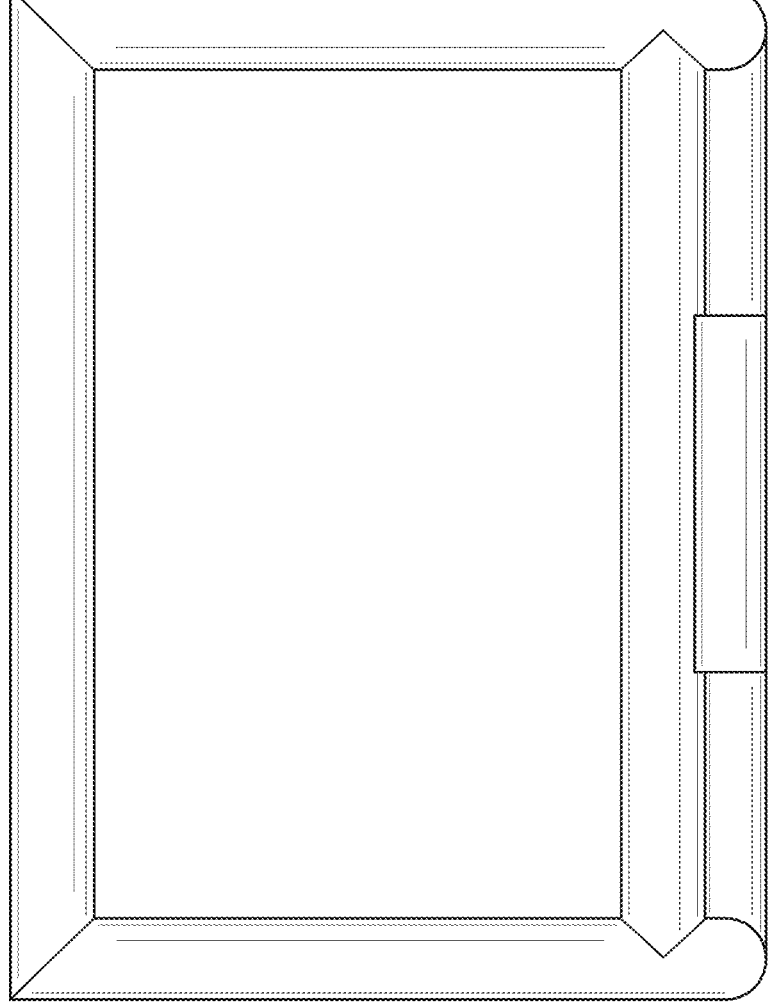
Figure 1B:
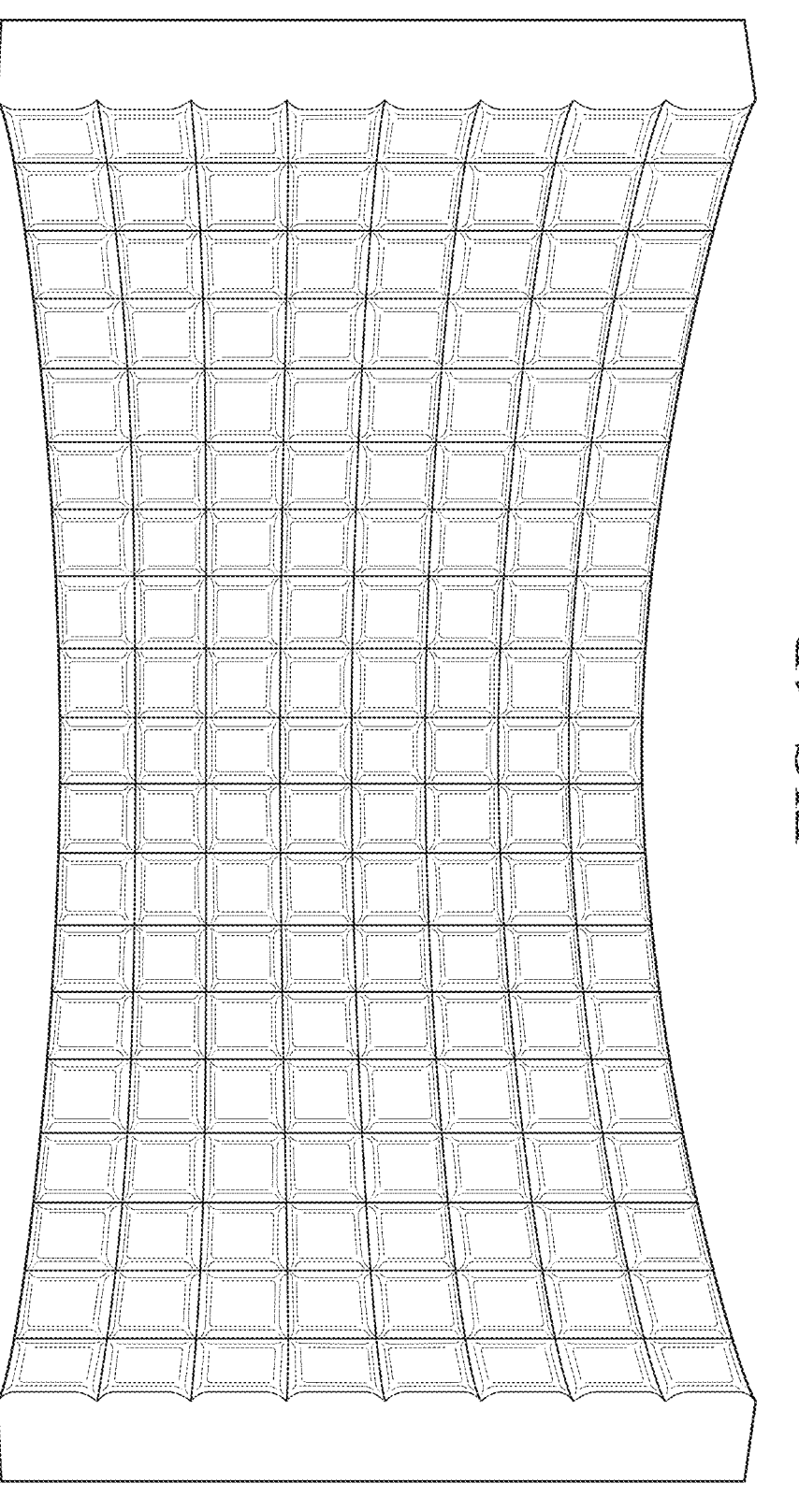
FIG. 1B illustrates another example of a prior art inflatable structure.

Examples of prior art inflatable structures are shown in FIGS. 1A and 1B.

Figure 2:
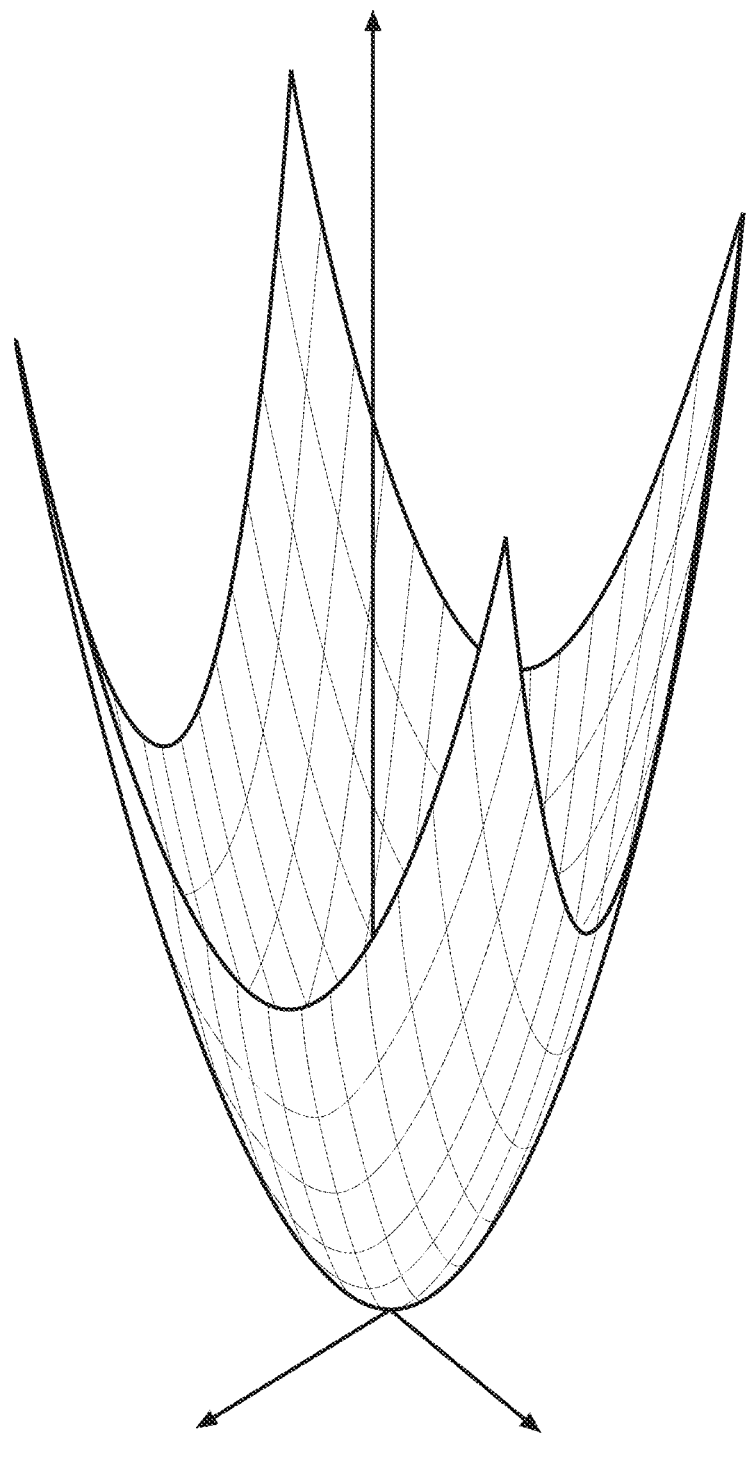
FIG. 2 illustrates an example of a curved bowl-like surface.

With respect to FIG. 1A, an inflatable tubular frame structure is shown. When inflated, the structure supports a projection screen via attachment of the screen to D-rings embedded within the fabric of the structure. In such an approach to displaying a projection screen, the rigidity of the structure prevents creating an adjustable curved surface. For example, if one desired a curved screen based on a bowl function (e.g., $z=ax^2+by^2+c$, where x is the horizontal axis, y is the vertical axis, z is the depth axis, and a, b, and c are adjustable parameters), an example of which is shown in FIG. 2, such a curved adjustable surface could not be created through the adjustment of external support columns alone, nor is it clear how other elements could be modified to provide such a curved screen.

With respect to FIG. 1B, an inflatable curved wall composed of multiple pouch-like internal elements as shown. This approach also has numerous deficiencies with respect to providing an adjustable curved surface, such as the pouches being fixed in size and curvature and also forming an irregular bulge like pattern. Accordingly, such a fixed inflatable curved wall also does not provide an ability to create a dynamically adjustable curved surface (such as one defined by a bowl function as described above).

Systems, methods, and other embodiments associated with creating adjustable curved surfaces using inflatable structures are described herein. For example, by use of fibers such as silver-coated twisted coiled actuators (TCPAs) attached to an inflatable structure (or each other), the shape of the structure (such as its curvature) may be adjusted by contraction or expansion of such fibers by applying various electrical voltages or currents to adjust the temperature of the TCPAs.

Figure 3:
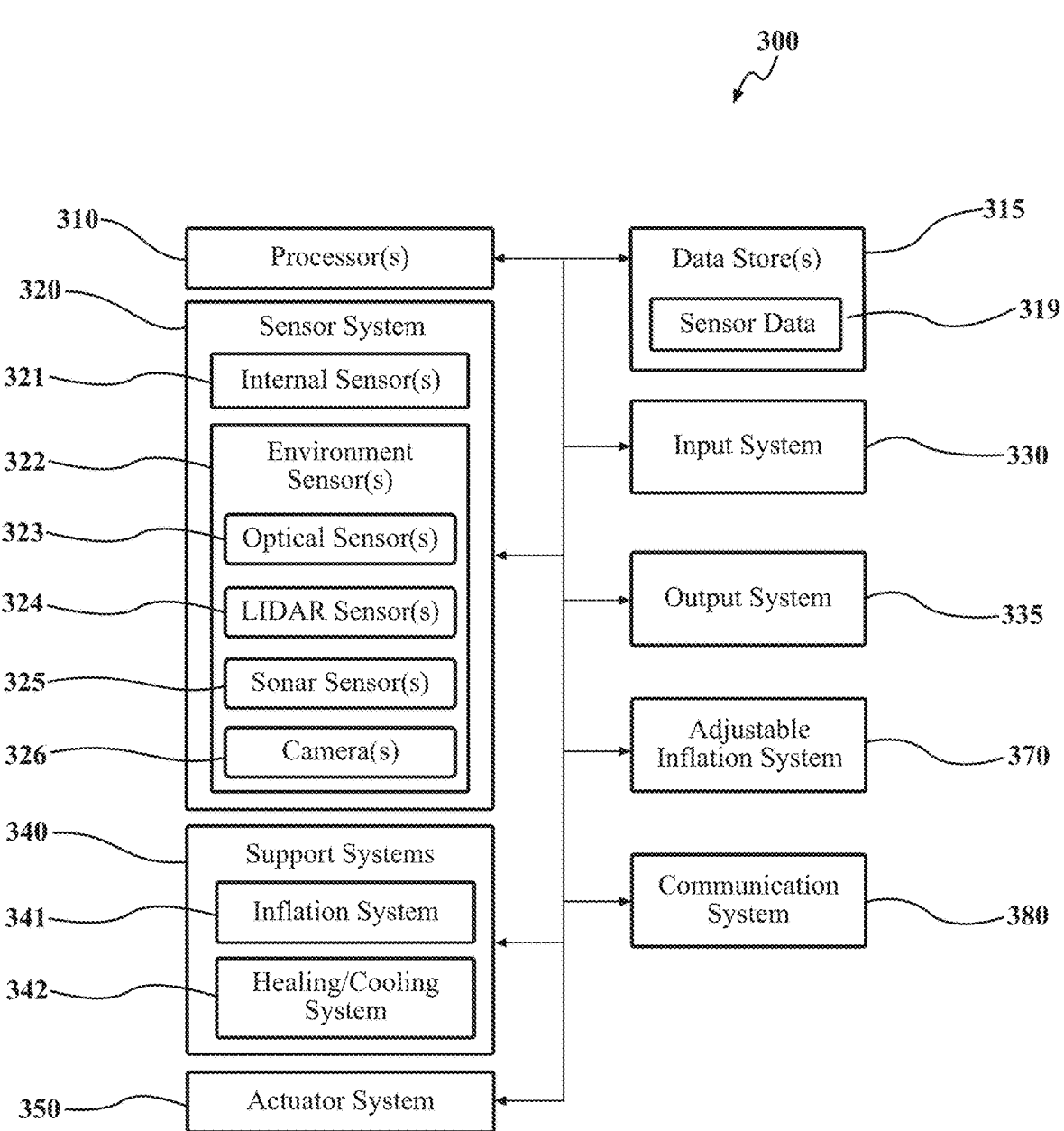
FIG. 3 illustrates one embodiment of an adjustable inflatable structure within which systems and methods disclosed herein may be implemented.

Referring to FIG. 3, an example of an adjustable inflatable structure 300 is illustrated. As used herein, a "adjustable inflatable structure" is any form of an inflatable object having at least one elastic or otherwise flexible surface whose shape can be adjusted by the use of fibers as described herein. In one or more implementations, adjustable inflatable structure 300 is an adjustable inflatable wall. While arrangements will be described herein with respect to an adjustable inflatable wall, it will be understood that embodiments are not limited to adjustable inflatable walls. In some implementations, adjustable inflatable structure 300 may be any form of inflatable structure that, for example, includes any fibers or fibrous material that exhibit expansion or contraction due to a thermal or electrical stimulus, and thus benefits from the functionality discussed herein associated with strategies for adjustable inflatable objects.

Adjustable inflatable structure 300 includes various elements. It will be understood that in various embodiments it may not be necessary for adjustable inflatable structure 300 to have all of the elements shown in FIG. 3. Adjustable inflatable structure 300 may have any combination of the various elements shown in FIG. 3. Further, adjustable inflatable structure 300 may have additional elements to those shown in FIG. 3. In some arrangements, adjustable inflatable structure 300 may be implemented without one or more of the elements shown in FIG. 3. While the various elements are shown as being located within adjustable inflatable structure 300 in FIG. 3, it will be understood that one or more of these elements may be located external to adjustable inflatable structure 300. Further, the elements shown may be physically separated by large distances. For example, as discussed, one or more components of the disclosed system may be implemented within adjustable inflatable structure 300 while further components of the system are implemented within a cloud-computing environment or other system that is remote from adjustable inflatable structure 300.

Some of the possible elements of adjustable inflatable structure 300 are shown in FIG. 3 and will be described along with subsequent figures. However, a description of many of the elements in FIG. 3 will be provided after the discussion of FIGS. 4-8 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements. In either case, adjustable inflatable structure 300 includes an inflatable adjustment system 370 that is implemented to perform methods and other functions as disclosed herein. As will be discussed in greater detail subsequently, inflatable adjustment system 370, in various embodiments, is implemented partially within adjustable inflatable structure 300 and as a cloud-based service. For example, in one approach, functionality associated with at least one module of inflatable adjustment system 370 is implemented within adjustable inflatable structure 300 while further functionality is implemented within a cloud-based computing system.

Figure 4:
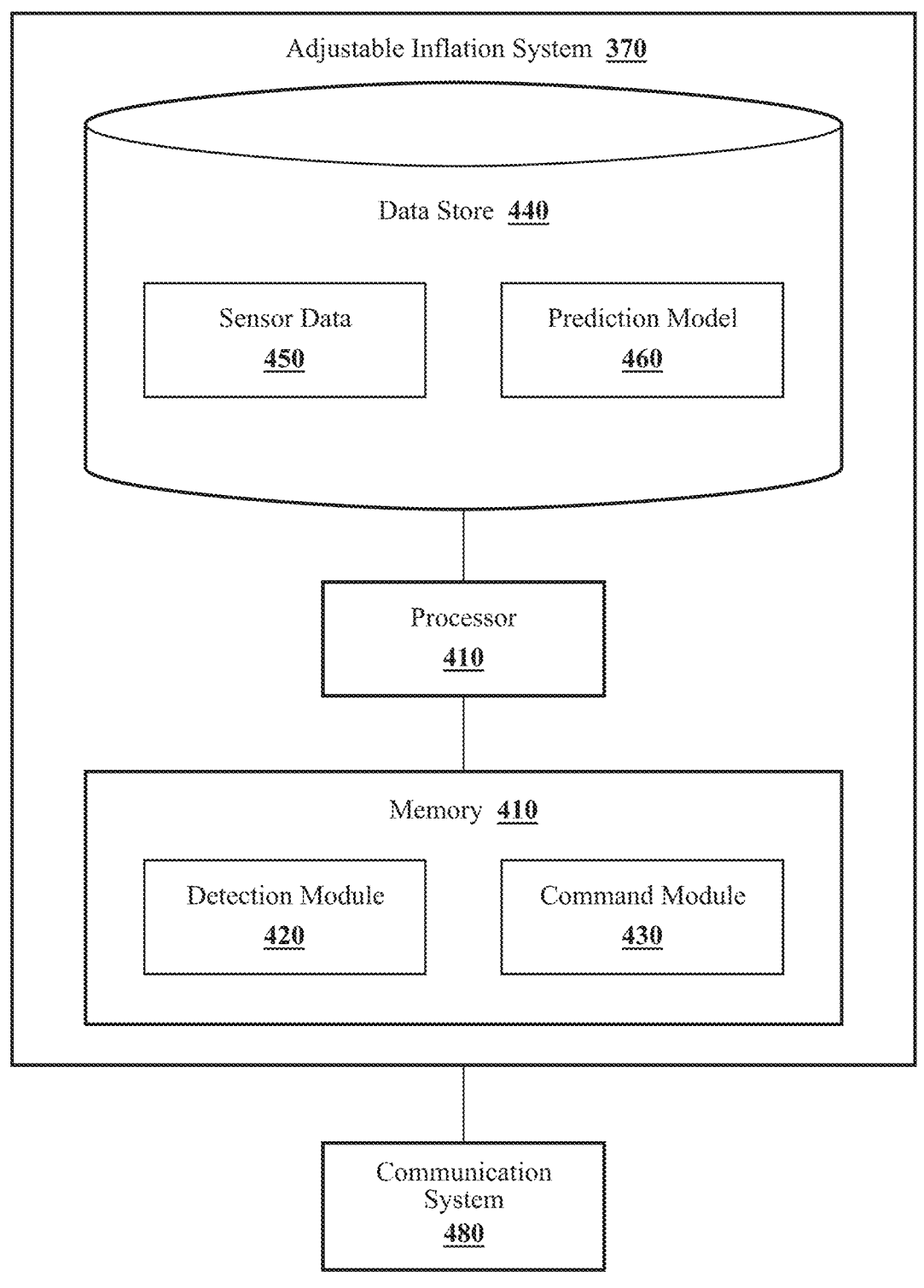
FIG. 4 illustrates one embodiment of an adjustable inflatation system that is associated with adjustable inflatable structures.

With reference to FIG. 4, one embodiment of inflatable adjustment system 370 of FIG. 3 is further illustrated. Inflatable adjustment system 370 is shown as including processor(s) 310 from adjustable inflatable structure 300 of FIG. 3. Accordingly, processor(s) 310 may be a part of inflatable adjustment system 370, inflatable adjustment system 370 may include a separate processor from processor 310 (s) of adjustable inflatable structure 300, or inflatable adjustment system 370 may access processor 310 (s) through a data bus or another communication path. In one embodiment, inflatable adjustment system 370 includes memory 410, which stores detection module 420 and command module 430. Memory 410 is a random-access memory (RAM), read-only memory (ROM), a hard-disk drive, a flash memory, or other suitable memory for storing detection module 420 and command module 430. Detection module 420 and command module 430 are, for example, computer-readable instructions that when executed by processor(s) 310 cause processor(s) 310 to perform the various functions disclosed herein.

Inflatable adjustment system 370 as illustrated in FIG. 4 is generally an abstracted form of inflatable adjustment system 370 as may be implemented between adjustable inflatable structure 300 and a cloud-computing environment. Accordingly, inflatable adjustment system 370 may be embodied at least in part within a cloud-computing environment to perform the methods described herein.

With reference to FIG. 4, detection module 420 generally includes instructions that function to control processor(s) 310 to receive data inputs from one or more sensors of adjustable inflatable structure 300. The inputs are, in one embodiment, observations of one or more conditions in an environment proximate to adjustable inflatable structure 300 (e.g., ambient temperature, humidity, internal temperatures), other aspects about the surroundings (e.g., location of projected light source), or both. As provided for herein, detection module 420, in one embodiment, acquires sensor data 450 that includes at least ambient environmental conditions. In further arrangements, detection module 420 acquires sensor data 450 from further sensors such as optical sensors or other sensors as may be suitable for determining adjustments to an adjustable inflatable structure 300.

Accordingly, detection module 420, in one embodiment, controls the respective sensors to provide sensor data 450. Additionally, while detection module 420 is discussed as controlling the various sensors to provide sensor data 450, in one or more embodiments, detection module 420 may employ other techniques to acquire sensor data 450 that are either active or passive. For example, detection module 420 may passively sniff sensor data 450 from a stream of electronic information provided by the various sensors to further components within adjustable inflatable structure 300. Moreover, detection module 420 may undertake various approaches to fuse data from multiple sensors when providing sensor data 450, from sensor data acquired over a wireless communication link (e.g., Bluetooth) from one or more of the surrounding devices (e.g., a remote control, a video projector), or from a combination thereof. Thus, sensor data 450, in one embodiment, represents a combination of perceptions acquired from multiple sensors.

Sensor data 450 may include a location of adjustable inflatable structure 300 and may also include, for example, Ultra-Wide Band (UWB) location tracking data, GPS data, or other location data. Moreover, detection module 420, in one embodiment, controls the sensors to acquire sensor data about an area that encompasses 360 degrees about adjustable inflatable structure 300, which may then be stored in sensor data 450. In some embodiments, such area sensor data may be used to provide a comprehensive assessment of the surrounding environment around adjustable inflatable structure 300, such as the location of a video projector, smart devices, people, and so on. Of course, in alternative embodiments, detection module 420 may acquire the sensor data about a particular region alone when, for example, adjustable inflatable structure 300 is not equipped with further sensors to include additional regions about adjustable inflatable structure 300 (e.g., only has optical sensors behind where a projector screen may be present) or the additional regions are not scanned due to other reasons (e.g., unnecessary due to known current conditions).

Moreover, in one embodiment, Inflatable adjustment system 370 includes a database 440. Database 440 is, in one embodiment, an electronic data structure stored in memory 410 or another data store and that is configured with routines that may be executed by processor(s) 310 for analyzing stored data, providing stored data, organizing stored data, and so on. Thus, in one embodiment, database 440 stores data used by the detection module 420 and command module 430 in executing various functions. In one embodiment, database 440 includes sensor data 450 along with, for example, metadata that characterize various aspects of sensor data 450. For example, the metadata may include location coordinates (e.g., longitude and latitude) or time/date stamps from when separate sensor data 450 was generated, and so on.

With reference to FIG. 4, command module 430 generally includes instructions that function to control processor(s) 310 to analyze sensor data 450 and make determinations as to actions that may occur with respect to adjustable inflatable structure 300.

In some embodiments, command module 430 based on sensor data 450 may determine the extent of inflation, heating, cooling, or any other support functions described herein that are to be provided by support systems 340. For example, if command module 430 detects an ON or OFF request via sensor data 450 then command module 430 may instruct inflation system 341 to inflate or deflate adjustable inflatable structure 300. As another example, command module 430 may determine via sensor data 450 that ambient or internal temperature measurements are outside of operating specifications, in which case command module 430 may instruct heating/cooling system 342 to provide heating or cooling within adjustable inflatable structure 300. In this manner, command module 430 may ensure that a set of internal temperature measurements of adjustable inflatable structure 300 meet the required operating specifications. As yet another example, command module 430 may determine via sensor data 450 the elevation of adjustable inflatable structure 300, then send instructions to inflation system 341 such that adjustable inflatable structure 300 is inflated to an appropriate pressure for such an elevation (e.g., by using a formula or a look-up table using elevation as an input).

In some embodiments, command module 430 may determine the location of remote objects near adjustable inflatable structure 300. For example, command module 430 based on optical sensor data within sensor data 450 may determine the location of a light source (e.g., video projector). In some embodiments, adjustable inflatable structure 300 may have an array of optical sensors measuring light intensity located behind where a projection screen is integrated into or attached to adjustable inflatable structure 300. Based on the position of the sensors behind the screen relative to the light source, command module 430 may evaluate which sensors are closest or furthest from the light source based on measurements of light intensity from the sensors and in this way determine the direction of the light source.

As another example, in some embodiments command module 430 based on location data within sensor data 450 may determine the location of one or more remotes object relative to adjustable inflatable structure 300. For instance, command module 430 may determine via UWB location tracking data the location of a user's smartphone or smartwatch, which may then be used as a proxy for the user's location. As yet another example, command module 430 based on camera or lidar data within sensor data 450 may determine where users are located relative to adjustable inflatable structure 300, which in some instances may also include if the user is looking toward adjustable inflatable structure 300.

In some embodiments, command module 430 may send instructions to actuator system 350 to adjust the state of an actuator controlled by actuator system 350. In some embodiments, actuator system 350 may receive such instructions adjusting the state of an actuator and then determine the change to be implemented with respect to an electrical or thermal stimulus being applied to an actuator. For example, actuator system 350 based on instruction to contract a TCPA by a specified amount may determine a change in an electrical or thermal stimulus to be applied to the TCPA to achieve that contraction and then implement it.

Figure 5:
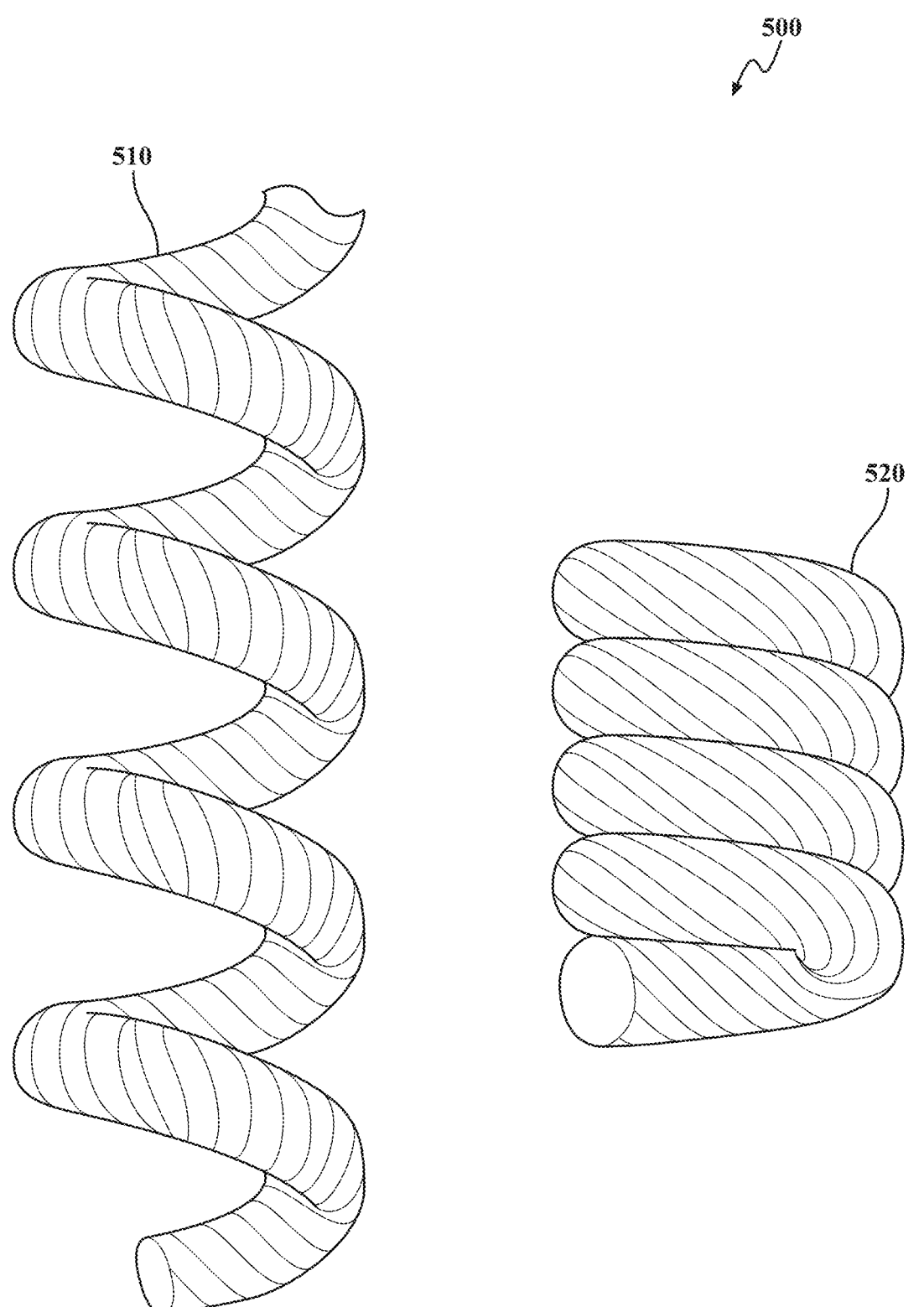
FIG. 5 illustrates two example states of a TCPA.

An example of a TCPA 500 in two different states is shown in FIG. 5. TCPA 510 is an example of TCPA 500 in a relaxed state, while TCPA 520 shows TCPA 500 in a contracted state. TCPA 500 may be composed of a material, such as nylon or polyethylene, that provides contraction in its length under a mechanical load when subjected to a thermal stimulus. Such an actuator may be fabricated by inserting twist into a polymer fiber to form a coiled fiber as shown in FIG. 5. Such fibers may then be coated with a conductive material (e.g., silver) to allow for electrical signals to adjust the temperature of the fiber through resistive heating. Accordingly, when an electrical current/voltage is applied to the fiber, the fiber (e.g., TCPA 500) may contract from a relaxed state (e.g., TCPA 510) to a contracted state (e.g., TCPA 520).

While examples are given below with respect to the use of TCPAs to provide adjustable inflatable structures, it should be understood that other fibers that contract under a thermal or electrical stimulus may be used in place of TCPAs. It should also be understood that any fibers that exhibit expansion, rather than contraction, under a thermal or electrical stimulus may also be used in place of TCPAs. For example, a contractable fiber that goes from length A to length B by using an increased stimulus may be replaced by an expandable fiber that goes from length A to length B using a reduction in stimulus.

Generally, command module 430 may also adjust for differences in linear or non-linear contractions (or expansions) as between different fibers affected by determining different thermal or electrical stimulus that achieve a desired length. For example, command module 430 may provide feedback, calibration, or both to actuator system 350. In such an embodiment, an external camera may be able to provide images that allow command module 430 to determine the actual shape of adjustable inflatable structure 300. Command module 430 may then proceed through a set of adjustments via actuator system 350 to determine the extent that any fiber or structure attached to a fiber are out of alignment, after which any deviations detected may be used to change the stimulus applied to achieve the desired effect. In one embodiment, command module 430 may use infrared camera data to better isolate measurements of changes in a contractable or expandable fiber due to a electrical or thermal stimulus.

Figures 6A, 6B, 6C:
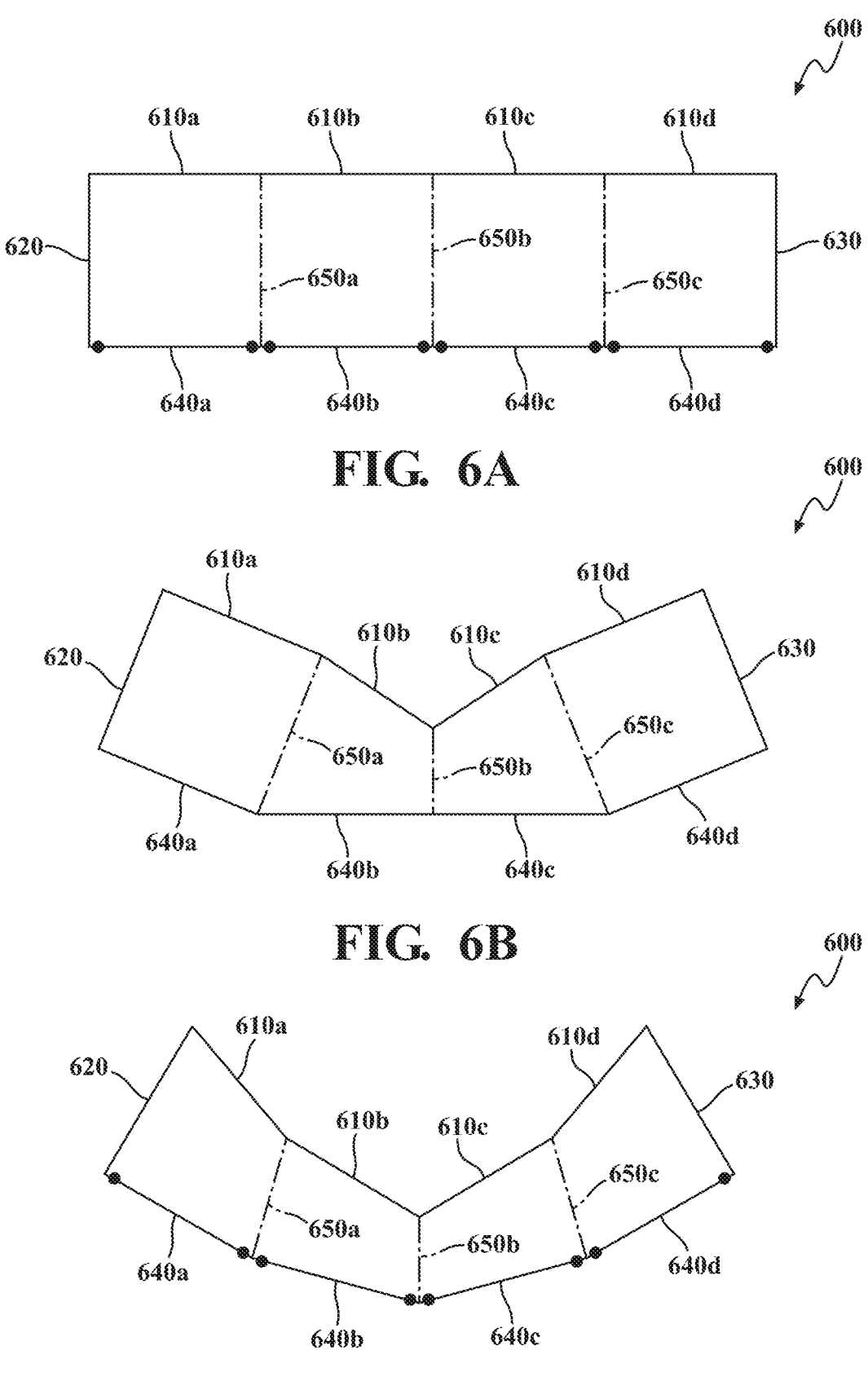
FIG. 6A illustrates a first state of an adjustable inflatable structure.
FIG. 6B illustrates a second state of an adjustable inflatable structure.
FIG. 6C illustrates a third state of an adjustable inflatable structure.

With respect to FIG. 6A, a simple example of an adjustable inflatable structure 600 utilizing actuator system 350 to adjust its shape is shown. Adjustable inflatable structure 600 may be comprised of a front surface composed of four front segments 610a-d, side segments 620 and 630, and a rear surface composed of four rear segments 640a-d. Adjustable inflatable structure 600 may also be comprised of a top segment and bottom segment (not shown) that completes the remaining surfaces of the adjustable inflatable structure 600. In addition, adjustable inflatable structure 600 may be connected internally by TCPA 650a, TCPA 650b, and TCPA 650c, each of which is connected at a point between two front segments or two rear segments (e.g., TCPA 650*a* is connected to in between front segment 610*a* and front segment 610*b*; and also connected between rear segment 640*a* and rear segment 640*b*). Rear segments 640*a-d* may be comprised of a semi-flexible material such that it is rigid within the rear segment but flexible at edges of the rear segment (except it is assumed for the purposes of this example that the rear segments can only bend inward, not outward). As to the remaining surfaces, they may comprise any flexible material suitable for an inflatable structure (e.g., 210D nylon oxford).

With respect to FIG. 6B, an example is shown of how adjustable inflatable structure 600 may react if an electrical stimulus is applied to TCPA 650*b*. As TCPA 650*b* contracts, it may pull the ends of front segments 610*b* and 610*c* along with it. This may then further cause, due to TCPA 650*b*'s connection to front segment 610*b*, a section defined by front segment 610*a*, side segment 620, rear segment 640*a*, and TCPA 650*a* to rotate toward the center of the inflatable screen as shown. Similarly, due to TCPA 650*b*'s connection to front segment 610*c*, a section defined by front segment 610*d*, side segment 630, rear segment 640*d*, and TCPA 650*c* to rotate toward the center of the inflatable screen as shown. Similarly, in order to achieve a more curved surface, electrical stimulus may also be applied to TCPA 650*a* and TCPA 650*c* to cause them to contract. As shown in FIG. 6C, the result of the contractions of TCPA 650A, TCPA 650*b*, and TCPA 650*c* is more representative of a curved inflatable structure.

Accordingly, it should be understood that a TCPA under the control of actuator system 350 may be added to an adjustable inflatable structure 300 to cause contraction between at least two points of the inflatable structure connected by such a TCPA. Additional TCPAs may be added to allow for greater freedom in adjusting such an inflatable structure. By adding multiple TCPAs in this manner, actuator system 350 may be able to adjust the shape of adjustable inflatable structure 300 at a variety of different locations by applying an electrical or thermal stimulus to the TCPAs that connect to such locations. For example, a surface of an adjustable inflatable structure may be made to conform with a curved surface (e.g., as defined by a bowl function) by adding TCPAs as described above to adjust the surface to conform to the desired curvature.

Figure 7:
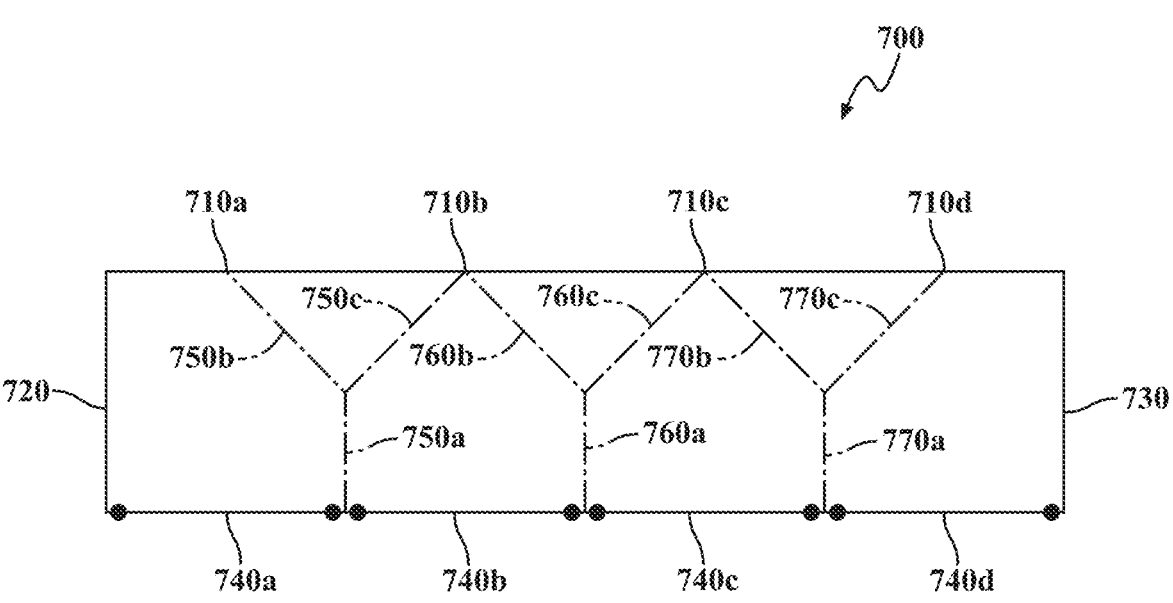
FIG. 7 illustrates one example of an adjustable inflatable structure with interconnected TCPAs.

In some embodiments, connections of TCPAs with each other may allow actuator system 350 to control contractions between more than two points of an inflatable structure based on an electrical or thermal stimulus to a single TCPA. For example, as shown in FIG. 7, TCPA 750*a* may connect a point between rear segments 740*a* and 570*b* of adjustable inflatable structure 700 to TCPA 750*b* (which further connects to a point on front segment 710*a*) and TCPA 750*c* (which further connections to a point on front segment 710*b*). In such a configuration, TCPAs 750*a-c* may allow actuator system 350 to adjust the contraction between three points of the adjustable inflatable structure 700 (e.g., by adjusting the electrical or thermal stimulus for any of TCPAs 750*a-c*).

With respect to the electrical connections between actuators managed by actuator system 350 (e.g., TCPAs) and any device used by actuator system 350 to generate electrical stimulus for such actuators (e.g., a (e.g., signal generator), such connections may be supplied by other conductive fibers (e.g., silver coated fibers with or without a twisted coil structure), metal wires, foil, and so on.

While examples herein are given typically with respect to inflatable structures using a gas such as air or helium, it should also be understood that other gases (e.g., nitrogen, argon, hydrogen) or liquids (e.g., water) may be used to inflate such structures. In addition, command module 430 may use inflation system 341 to maintain adjustable inflatable structure 300 or one or more cells therein (e.g., separate inflatable compartments within an inflatable structure) at a one or more specified pressure(s). In some embodiments, inflation system 341 may encompass one or more pumps, one or more valves, or other mechanisms that allow command module 430 to maintain adjustable inflatable structure 300 at a specific pressure (or the cells of adjustable inflatable structure 300 at one or more cell pressures). For instance, command module 430 may instruct inflation system 341 to sequentially inflate cells from the bottom to the top of adjustable inflatable structure 300 in a sequential manner, thereby reducing potentially erratic movements of adjustable inflatable structure 300 as it inflates. Similarly, command module 430 may instruct inflation system 341 to sequentially deflate cells from the top to the bottom of adjustable inflatable structure 300 in a sequential manner. Pumps, valves, or other pressure-regulating mechanisms may be located within, on, or outside adjustable inflatable structure 300. For example, external pumps may be used to fill adjustable inflatable structure 300 with a gas or liquid, while internal valves are used to adjust the availability of the gas or liquid between cells of adjustable inflatable structure 300.

Moreover, command module 430 may use heating/cooling system 342 to maintain adjustable inflatable structure 300 or one or more cells therein (e.g., separable inflatable compartments within an inflatable structure) at one or more specified temperature(s). In some embodiments, heating/cooling system 342 may utilize heating or cooling mechanisms that heat or cool a gas or liquid as it is pumped into or held within adjustable inflatable structure 300. In some instances, the heating or cooling mechanisms may allow for heating or cooling of multiple cells within an inflatable structure at different temperatures. In some embodiments, command module 430 may also use heating/cooling system 342 to adjust the temperature of one or more fibers (e.g., separable inflatable compartments within an inflatable structure) separate from that achieved through electrical stimulus. For example, heating/cooling system 342 may utilize fans, coolant running in tubes that pass by the fiber, or other heating or cooling mechanisms directed at specific fibers to adjust the temperature of one or more fibers.

In this manner, command module 430 maybe be able to adjust the temperature of the gas or liquid supporting inflation, thereby affecting the length of fibers in contact with such gas or liquid, and also adjust the temperature of the fibers independently (or semi-independently) relative to such gas or liquid as a whole. For example, adjusting the temperature of the gas or liquid supporting inflation (e.g., applying a general thermal stimulus) may ensure that the fibers as a whole are properly biased to perform within a pre-determined temperature range. Furthermore, the ability to adjust the temperatures of fibers individually or as a group (e.g., applying a more directed thermal stimulus, such as by fans) may allow such fibers to return more quickly to a desired state after an electrical stimulus to such fibers is removed.

In some embodiments, command module 430 may be used to determine the placement of fibers within adjustable inflatable structure 300. For example, command module 430 may receive different states that an adjustable inflatable structure 300 is to achieve as defined by its surfaces (e.g., three-dimensional representations of the adjustable inflatable structure 300 as shown in FIGS. 6A-C). In some embodiments, different states may be defined by the shape of both internal surfaces and external surfaces of an adjustable inflatable structure. In some embodiments, an initial selection of fibers to achieve such states may also be provided. In addition, constraint parameters may be specified such as the maximum or minimum number of fibers allowed, whether interconnection of fibers are permitted, the permitted allowances for deviation from the surfaces of the different states, a surface density requirement (e.g., how far apart with respect to a surface are fiber connections allowed to occur), minimum or maximum lengths of fibers allowed, restrictions on the angles at which a fiber can connect to a surface or another fiber, a minimum free-space spacing required between fibers not connected to each other (e.g., to ensure free movement of the fibers within adjustable inflatable structure 300 as they contract or expand), the manner of forming electrical interconnections (e.g., conductive fibers, foil, wires), the maximum or minimum diameter of strands within a fiber, the maximum or minimum number of strands within a fiber (e.g., 2-ply, 3-ply), an internal grid spacing that may be used to determine the placement of fibers, a maximum or minimum amount of allowable contraction or expansion of the fibers, a maximum or minimum allowable amount of voltage or current applied to fibers (individually or within an area), a maximum or minimum allowable thermal gradient with respect to heating or cooling that may occur within an area of adjustable inflatable structure 300 (e.g., to avoid hot spots), heating or cooling options, inflation options, and so on.

In view of the different states that adjustable inflatable structure 300 is to achieve and any constraint parameters, command module 430 may then use an algorithm to determine arrangements of fiber that will achieve the desired different states. In some embodiments, such an algorithm may involve seeking to achieve goals such as minimizing the use of fibers, minimizing cost, minimizing power, minimizing transition time, or other desirable outcomes. In some embodiments, command module 430 may then use such goals to enable a gradient-descent algorithm that searches for fiber configurations that can achieve an optimal configuration within the constraint parameters provided. In some embodiments, command module 430 may use machine learning to evaluate the different states and constraint parameters to achieve an optimal configuration. In some embodiments, an optimal configuration as described above may only be a locally optimal result due to the limitations of the algorithmic search or machine learning capabilities. It should be understood that in determining an optimal configuration that command module 430 may not only adjust the number of fibers and their connections to an inflatable structure or each other, but also the diameter of individual strands within a fiber or the number of strands composing the fiber (e.g., 2-ply, 3-ply).

In some embodiments, command module 430 may utilize tracking data to determine which state adjustable inflatable structure 300 should be in. For example, adjustable inflatable structure 300 may have numerous states allowing for a curved projection screen that can shift the focus of such a curved surface. In such an embodiment, the angle of the focus of such a curved surface may be moved up or down or left to right within pre-determined constraints. Command module 430 may then use tracking data within sensor data 450 to select a state that is optimal with respect to one or more remote objects. For example, command module 430 may select a state where the focus of the curved surface is directed toward the brightest source of light (e.g., a video projector). In some embodiments, command module 430 may determine a state that allows two or more remote objects to be within a pre-determined relationship relative to a surface of adjustable inflatable structure 300. For example, where adjustable inflatable structure 300 utilizes reflective material, command module 430 may determine the state that best achieves reflection of light from one remote object to another (e.g., light from the sun to be reflected on a remote object being photographed).

In some embodiments, adjustable inflatable structure 300 may contain internal emitters that project optical signals on a surface. In such an embodiment, command module 430 may select states of adjustable inflatable structure 300 that best display such optical information according to a pre-determined specification (e.g., an initial inflation configuration state). In some embodiments, the selection of states may then be modified based on tracking data (e.g., to align an aspect of a surface of adjustable inflatable structure 300 toward a remote object).

In some embodiments, command module 430 may be used to execute animations. For example, adjustable inflatable structure 300 may take the form of an inflatable puppet used during parades. During such a parade, animations may be used to transition through different states of adjustable inflatable structure 300. For instance, a loop animation may be used to instruct adjustable inflatable structure 300 to transition repeatedly through a specific set of different states such that the inflatable puppet appears to be waving. As another example, animations may also be used to direct the head of the puppet from left to right, up or down, etc. In some embodiments, animations may incorporate tracking data to adjust the states being transition through (e.g., states that may cause contact with a remote object, such as a building or light pole, may be prohibited).

Figure 8:
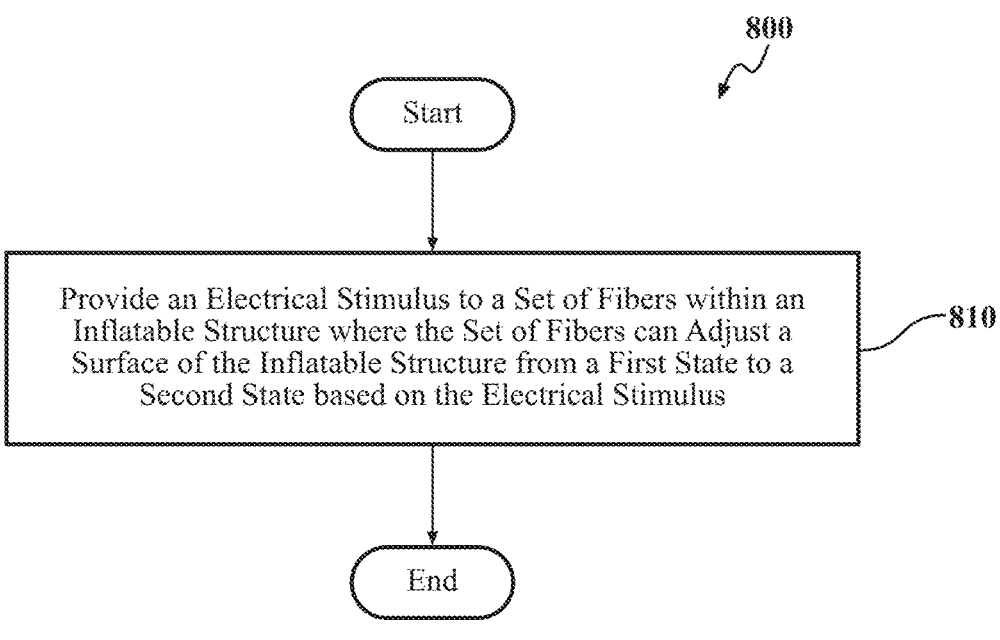
FIG. 8 illustrates one example of a method for adjustable inflatable structures.

FIG. 8 illustrates a flowchart of a method 800 that is associated with adjustable inflatable structure 300. Method 800 will be discussed from the perspective of inflatable adjustment system 370 of FIGS. 3 and 4. While method 800 is discussed in combination with the inflatable adjustment system 370, it should be appreciated that the method 800 is not limited to being implemented within inflatable adjustment system 370 but is instead one example of a system that may implement method 800.

At step 810, command module 430 may provide an electrical stimulus to a set of fibers within an inflatable structure where the set of fibers can adjust a surface of the inflatable structure from a first state to a second state based on the electrical stimulus. For example, an inflatable structure may be inflated to an initial default state. Next, a set of instructions sent from command module 430 to actuator system 350 may cause a surface of the inflatable structure (e.g., made of a material suitable for projection such as 210D nylon oxford) to form a curved screen (e.g., via TCPAs receiving an electrical stimulus from actuator system 350). Based on location data, command module 430 may determine the location of a light source and then send additional instructions to actuator system 350 that causes a change in the electric stimulus, such that the curved surface of the inflatable structure shifts the focus of the curved surface toward the light source. As another example, command module 430 may send instructions to actuator system 350 to adjust the curvature of the surface (e.g., more curved, less curved).

FIG. 3 will now be discussed in full detail as an example environment within which the system and methods disclosed herein may operate.

Adjustable inflatable structure 300 may include one or more processors 310. In one or more arrangements, processor(s) 310 may be a main processor of adjustable inflatable structure 300. For instance, processor(s) 310 may be an electronic control unit (ECU). Adjustable inflatable structure 300 may include one or more data stores 315 for storing one or more types of data. Data store(s) 315 may include volatile memory, non-volatile memory, or both. Examples of suitable data store(s) 315 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. Data store(s) 315 may be a component of processor(s) 310, or data store 315 may be operatively connected to processor(s) 310 for use thereby. The term "operatively connected," as used throughout this description, may include direct or indirect connections, including connections without direct physical contact.

In one or more arrangements, data store(s) 315 may include the allowable states of adjustable inflatable structure 300, animations, etc.

Data store(s) 315 may include sensor data 319. In this context, "sensor data" means any information about the sensors that adjustable inflatable structure 300 is equipped with, including the capabilities and other information about such sensors. As will be explained below, adjustable inflatable structure 300 may include sensor system 320. Sensor data 319 may relate to one or more sensors of sensor system 320. As an example, in one or more arrangements, sensor data 319 may include information on one or more optical sensors of sensor system 320.

In some instances, at least a portion of sensor data 319 may be located in data stores(s) 315 located onboard adjustable inflatable structure 300. Alternatively, or in addition, at least a portion of sensor data 319 may be located in data stores(s) 315 that are located remotely from adjustable inflatable structure 300.

As noted above, adjustable inflatable structure 300 may include sensor system 320. Sensor system 320 may include one or more sensors. "Sensor" means any device, component, or system that may detect or sense something. The one or more sensors may be configured to sense, detect, or perform both in real-time. As used herein, the term "real-time" means a level of processing responsiveness that a user or system senses as sufficiently immediate for a particular process or determination to be made, or that enables the processor to keep up with some external process.

In arrangements in which sensor system 320 includes a plurality of sensors, the sensors may work independently from each other. Alternatively, two or more of the sensors may work in combination with each other. In such an embodiment, the two or more sensors may form a sensor network. Sensor system 320, the one or more sensors, or both may be operatively connected to processor(s) 310, data store(s) 315, another element of adjustable inflatable structure 300 (including any of the elements shown in FIG. 1), or any combination thereof. Sensor system 320 may acquire data of at least a portion of the external environment of adjustable inflatable structure 300 (e.g., nearby remote objects).

Sensor system 320 may include any suitable type of sensor. Various examples of different types of sensors will be described herein. However, it will be understood that the embodiments are not limited to the particular sensors described. Sensor system 320 may include one or more internal sensors 321 that may detect, determine, sense, or acquire in a combination thereof information about adjustable inflatable structure 300 itself. In one or more arrangements, internal sensors 321 may be configured to detect, sense, or acquire in a combination thereof position and orientation changes of adjustable inflatable structure 300, such as, for example, the location and orientation of adjustable inflatable structure 300. Internal sensors 321 may also be configured to detect, sense, or acquire in a combination thereof one or more characteristics of adjustable inflatable structure 300 (e.g., internal pressure, internal temperatures).

Alternatively, or in addition, sensor system 320 may include one or more environment sensors 322 configured to acquire, sense, or acquire in a combination thereof external environment data. "External environment data" includes data or information about the external environment in which an adjustable inflatable structure 300 is located or one or more portions thereof. For example, environment sensor(s) 322 may be configured to detect, quantify, sense, or acquire in any combination thereof obstacles in at least a portion of the external environment of adjustable inflatable structure 300, information/data about such obstacles, or a combination thereof. Such obstacles may be comprised of stationary objects, dynamic objects, or a combination thereof. Environment sensor(s) 322 may be configured to detect, measure, quantify, sense, or acquire in any combination thereof other things in the external environment of adjustable inflatable structure 300, such as, for example, light sources, location of smart devices, people proximate to adjustable inflatable structure 300, etc.

Various examples of sensors of sensor system 320 will be described herein. The example sensors may be part of the one or more environment sensor(s) 322, the one or more internal sensors 321, or both. However, it will be understood that the embodiments are not limited to the particular sensors described.

As an example, in one or more arrangements, sensor system 320 may include one or more optical sensors 323, one or more LIDAR sensors 324, one or more sonar sensors 325, one or more cameras 326, or any combination thereof. In one or more arrangements, camera(s) 326 may be high dynamic range (HDR) cameras or infrared (IR) cameras.

Adjustable inflatable structure 300 may include an input system 330. An "input system" includes any device, component, system, element or arrangement or groups thereof that enable information/data to be entered into a machine. Input system 330 may receive an input from a remote device (e.g., video projector, remote control, smart device), which may then be recorded to sensor data 450 (e.g., via detection module 420). Adjustable inflatable structure 300 may include an output system 335. An "output system" includes any device, component, or arrangement or groups thereof that enable information/data to be presented to a remote device.

Adjustable inflatable structure 300 may include one or more support systems 340. Various examples of support system(s) 340 are shown in FIG. 1. However, adjustable inflatable structure 300 may include more, fewer, or different support systems. It should be appreciated that although particular support systems are separately defined, each or any of the systems or portions thereof may be otherwise combined or segregated via hardware, software, or a combination thereof within adjustable inflatable structure 300. Adjustable inflatable structure 300 may include an inflation system 341, a heating/cooling system 342, other systems, or any combination thereof. Each of these systems may include one or more devices, components, or combinations thereof, now known or later developed.

Processor(s) 310, inflatable adjustment system 370, or a combination thereof may be operatively connected to communicate with various aspects of support system(s) 340 or individual components thereof. For example, returning to FIG. 1, processor(s) 310 may be in communication to send or receive information from various aspects of support system(s) 340 to control the inflation or temperature, etc. of adjustable inflatable structure 300. Processor(s) 310, inflatable adjustment system 370, or a combination thereof may control some or all of these support system(s) 340.

As used herein, "cause" or "causing" means to make, force, compel, direct, command, instruct, enable, or in any combination thereof an event or action to occur or at least be in a state where such event or action may occur, either in a direct or indirect manner.

Adjustable inflatable structure 300 may include actuator system 350. Actuator system 350 may be any element or combination of elements operable to modify, adjust, alter, or in any combination thereof one or more of surfaces of adjustable inflatable structure 300 or structural components thereof in response to receiving signals or other inputs from processor(s) 310, inflatable adjustment system 370, or a combination thereof. Any suitable actuator may be used. For instance, actuator system 350 may include TCPAs or other similar fibers, motors, pneumatic actuators, hydraulic pistons, relays, solenoids, and piezoelectric actuators, just to name a few possibilities.

Adjustable inflatable structure 300 may include one or more modules, at least some of which are described herein. The modules may be implemented as computer-readable program code that, when executed by processor(s) 310, implement one or more of the various processes described herein. One or more of the modules may be a component of processor(s) 310, or one or more of the modules may be executed on or distributed among other processing systems to which processor(s) 310 is operatively connected. The modules may include instructions (e.g., program logic) executable by processor(s) 310. Alternatively, or in addition, data store(s) 315 may contain such instructions.

In one or more arrangements, one or more of the modules described herein may include artificial or computational intelligence elements, e.g., neural network, fuzzy logic, or other machine learning algorithms. Further, in one or more arrangements, one or more of the modules may be distributed among a plurality of the modules described herein. In one or more arrangements, two or more of the modules described herein may be combined into a single module.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-8, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components, or processes described above may be realized in hardware or a combination of hardware and software and may be realized in a centralized fashion in one processing system or in a distributed fashion where different elements are spread across several interconnected processing systems. Any kind of processing system or another apparatus adapted for carrying out the methods described herein is suited. A typical combination of hardware and software may be a processing system with computer-usable program code that, when being loaded and executed, controls the processing system such that it carries out the methods described herein. The systems, components, or processes also may be embedded in a computer-readable storage, such as a computer program product or other data programs storage device, readable by a machine, tangibly embodying a program of instructions executable by the machine to perform methods and processes described herein. These elements also may be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that may contain or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++, or the like and conventional procedural programming languages, such as the "C" programming language or similar programming languages. The program code may execute entirely on a user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC, or ABC).

Aspects herein may be embodied in other forms without departing from the spirit or essential attributes thereof. Accordingly, reference should be made to the following claims, rather than to the foregoing specification, as indicating the scope hereof.

What is claimed is:

1. A system, comprising:
an inflatable structure having a set of fibers that can adjust a surface of the inflatable structure from a first state to a second state based on an electrical stimulus applied to the set of fibers;
a processor; and
a memory communicably coupled to the processor and storing machine-readable instructions that, when executed by the processor, cause the processor to:
provide the electrical stimulus to the set of fibers.

2. The system of claim 1, wherein the set of fibers is comprised of silver-coated twisted-coil polymer actuators.

3. The system of claim 2, wherein the surface in the first state has a different curvature as compared to the surface in the second state.

4. The system of claim 1, wherein the machine-readable instructions further include to:
determine the electrical stimulus to the set of fibers based on location data.

5. The system of claim 4, wherein the location data indicates a location of a light source.

6. The system of claim 1, wherein at least one fiber uses a different diameter strand than another fiber within the set of fibers.

7. The system of claim 1, wherein at least one fiber incorporates a different number of strands than another fiber within the set of fibers.

8. A non-transitory computer-readable medium including instructions that when executed by one or more processors cause the one or more processors to:
provide an electrical stimulus to a set of fibers within an inflatable structure where the set of fibers can adjust a surface of the inflatable structure from a first state to a second state based on the electrical stimulus.

9. The non-transitory computer-readable medium of claim 8, wherein the set of fibers is comprised of silver-coated twisted-coil polymer actuators.

10. The non-transitory computer-readable medium of claim 9, wherein the surface in the first state has a different curvature as compared to the surface in the second state.

11. The non-transitory computer-readable medium of claim 8, wherein the instructions further include to:
determine the electrical stimulus to the set of fibers based on location data.

12. The non-transitory computer-readable medium of claim 11, wherein the location data indicates a location of a light source.

13. The non-transitory computer-readable medium of claim 8, wherein at least one fiber uses a different diameter strand than another fiber within the set of fibers.

14. A method, comprising:
providing an electrical stimulus to a set of fibers within an inflatable structure where the set of fibers can adjust a surface of the inflatable structure from a first state to a second state based on the electrical stimulus.

15. The method of claim 14, wherein the set of fibers is comprised of silver-coated twisted-coil polymer actuators.

16. The method of claim 15, wherein the surface in the first state has a different curvature as compared to the surface in the second state.

17. The method of claim 14, further comprising:
determining the electrical stimulus to the set of fibers based on location data.

18. The method of claim 17, wherein the location data indicates a location of a light source.

19. The method of claim 14, wherein at least one fiber uses a different diameter strand than another fiber within the set of fibers.

20. The method of claim 14, wherein at least one fiber uses a different number of strands than another fiber within the set of fibers.

* * * * *